United States Patent
Quintin et al.

(10) Patent No.: US 9,985,868 B2
(45) Date of Patent: May 29, 2018

(54) TRANSFORMATION OF UNSTRUCTURED NETWORK INFRASTRUCTURES INTO STRUCTURED VIRTUAL TOPOLOGIES SUITABLE FOR SPECIFIC ROUTING ALGORITHMS

(71) Applicant: BULL SAS, Les Clayes Sous Bois (FR)

(72) Inventors: Jean-noel Quintin, Bourg la Reine (FR); Alain Cady, Limours en Hurepoix (FR)

(73) Assignee: BULL SAS, Les Clayes-Sous-Bois (FR)

( * ) Notice: Subject to any disclaimer, the term of this patent is extended or adjusted under 35 U.S.C. 154(b) by 68 days.

(21) Appl. No.: 15/173,789

(22) Filed: Jun. 6, 2016

(65) Prior Publication Data

US 2016/0366045 A1 Dec. 15, 2016

(30) Foreign Application Priority Data

Jun. 15, 2015 (FR) ...................... 15 55428

(51) Int. Cl.
*H04L 12/28* (2006.01)
*H04L 12/755* (2013.01)
*H04L 12/931* (2013.01)
*H04L 12/933* (2013.01)

(52) U.S. Cl.
CPC ............ *H04L 45/021* (2013.01); *H04L 49/15* (2013.01); *H04L 49/70* (2013.01)

(58) Field of Classification Search
None
See application file for complete search history.

(56) References Cited

U.S. PATENT DOCUMENTS

| 7,991,859 B1* | 8/2011 | Miller | H04L 41/0803 370/252 |
| 2008/0155537 A1* | 6/2008 | Dinda | G06F 9/4887 718/1 |
| 2014/0099119 A1* | 4/2014 | Wei | H04J 14/0257 398/79 |

(Continued)

OTHER PUBLICATIONS

Zahavi, "D-Mod-K Routing Providing Non-Blocking Traffic for Shift Permutations on Real Life Fat Trees", CCIT Report #776, Sep. 2010, pp. 1-7. (8 pages total).

(Continued)

*Primary Examiner* — Anh-Vu Ly
(74) *Attorney, Agent, or Firm* — Sughrue Mion, PLLC

(57) ABSTRACT

A method of extracting, from a physical topology, a virtual topology, the physical network topology including a plurality of switches connected to each other by their ports. The method includes the following steps: distribution of the leaf switches into sub-topologies according to the characteristics of the target topology, the sub-topologies being included in the virtual topology; inclusion of the neighboring switches connected only to the switches of a same sub-topology to the sub-topology; splitting of neighboring switches connected to a first sub-topology and to a second sub-topology into two virtual switches, the first virtual switch having the ports of the neighboring switch by which it is connected to the first sub-topology, the second virtual switch having the ports of the neighboring switch by which it is connected to the second sub-topology.

5 Claims, 3 Drawing Sheets

(56) References Cited

U.S. PATENT DOCUMENTS

| | | | |
|---|---|---|---|
| 2014/0195666 A1* | 7/2014 | Dumitriu | H04L 12/4625 709/223 |
| 2014/0313937 A1* | 10/2014 | Roper | H04L 45/02 370/255 |
| 2014/0369230 A1* | 12/2014 | Nallur | H04L 45/02 370/254 |
| 2016/0191194 A1* | 6/2016 | Wood | H04J 14/0286 398/58 |
| 2016/0191370 A1* | 6/2016 | Wood | H04L 45/02 370/238 |

OTHER PUBLICATIONS

Bhuyan et al., "Generalized Hypercube and Hyperbus Structures for a Computer Network", IEEE Transactions on Computers, vol. c-33, No. 4, Apr. 1984, pp. 323-333. (12 pages total).

\* cited by examiner

TRANSFORMATION OF UNSTRUCTURED NETWORK INFRASTRUCTURES INTO STRUCTURED VIRTUAL TOPOLOGIES SUITABLE FOR SPECIFIC ROUTING ALGORITHMS

FIELD OF INVENTION

The present invention generally concerns the adaptation of a "high-speed" network topology to a specific routing algorithm, and more particularly to the adaptation of an unstructured topology to a routing algorithm intended for a structured topology.

BACKGROUND

The logical structures of a high-speed network, called topologies, are generally divided into two classes: structured and unstructured.

Structured topologies designate topologies defined by a mathematical formalism (theoretical description). For example, the "Parallel Ports Generalized Fat Trees" (PGFT) (Zahavi E., "*D-Mod-K routing providing non-blocking traffic for shift permutations on real life fat trees*," webee.technion.ac.il/publication-link/index/id/574, 2010) are described by a formula enabling the topology to be reconstructed from a set of factors. Hypercubes are also cited (Bhuyan, L. N., & Agrawal, D. P. (1984), "Generalized hypercube and hyperbus structures for a computer network," Computers, IEEE Transactions on, 100 (4), 323-333). These network structures were theoretically designed to transmit messages efficiently between machines. To perform the transmissions efficiently within the network, routing algorithms dedicated to these topologies were developed. These algorithms are also included in the previously cited documents. Such algorithms are efficient, but usable only with the topologies according to the formalism for which they were developed.

Conversely, unstructured topologies do not follow any specific formalism and/or were not designed for routing. Generally, these are topologies not complying with a particular construction. They are potentially close to a formalism, but cannot be taken into account by the routing algorithm.

It follows that a structured topology favors the performances of routing algorithms both in terms of efficiency of routing as well as in regard to their execution time. The use of routing algorithms intended for structured topologies such as "Flattened Butterfly," "HyperX," "Torus" or "PGFT" confirm the benefit of this type of network topology.

However, a structured network topology is costly both in terms of network switches as well as in cables. Thus, reducing the cost of the network infrastructure by decreasing the number of network switches while preserving performance in terms of routing efficiency has become one of the concerns of network architects.

In this case, by reducing the number of network switches, the theoretical characteristics of the topology are no longer preserved and the routing algorithms specific to it are therefore no longer usable in this form. Indeed, since a step of analyzing and validating the structure of the physical topology is generally required in order to carry out a topology routing, if the structure of a topology is modified so that it is no longer suitable for the routing algorithm for which it was first intended, the routing cannot be achieved according to that routing algorithm.

In this regard, the known solutions, such as the one proposed by the "OpenSM" software for "InfiniBand," are only concerned with physical topology. In particular, according to these solutions, if the characteristics extracted from a modified physical topology do not correspond with the expectations of the routing algorithm, a fallback solution based on an algorithm that is more generic, less efficient and more costly in terms of performance time is generally adopted.

Moreover, most current network switches use a single routing table. It is therefore not possible to consider this type of network switch like several different entities in order to mitigate a reduction in the number thereof. Furthermore, the routing table of a network communicator would be written several times with conflicting data that would not be able to be merged. Moreover, for efficient routing, a destination must be reached by two different links, independent of the link by which the packet arrives, which cannot be achieved with a single routing table per network switch.

CERTAIN OBJECTS OF INVENTION

An object of the present invention, therefore, is to remedy the aforementioned disadvantages.

Another object of the present invention is to adapt a network topology, which, following a modification in its structure (particularly by reducing the number of network switches), is no longer suitable for the routing algorithm specific thereto, to said same routing algorithm in such a way as to preserve the routing performance in said high-speed network.

Another object of the present invention is to be able to reduce the cost of a structured topology while remaining suitable for a routing algorithm intended for a structured topology.

To that end, according to a first aspect, the invention relates to a method of extracting, from a physical network topology, a virtual topology suitable for a predefined routing algorithm, the physical network topology including a plurality of switches connected to each other by their ports in order to receive and/or transmit packets to or from leaf switches of said physical network topology, said physical network topology being different from a physical network topology of a predefined network topology type suitable for the predefined routing algorithm, said method comprising the following steps:

a) identification, in the physical network topology, of a plurality of sub-topologies, said sub-topologies having no switch in common, each sub-topology being of the predefined type of network topology and including at least one leaf switch, no switch of one sub-topology being connected to a switch of another sub-topology;

b) extension of each sub-topology by including therein one or more switches that are directly connected thereto and not being directly connected to any other sub-topology in such a way that the extended sub-topology is of the predefined type of network topology;

c) when a switch is directly connected to more than one sub-topology, splitting said switch into the same number of virtual switches, each virtual switch comprising the port or ports of the split switch by means of which said split switch is connected to the switch(es) of a sub-topology, the ports by means of which the split switch is connected to a switch not yet belonging to any sub-topology being distributed among the virtual switches, said virtual switches being considered as being switches;

d) repetition of steps b) and c) until each switch is included in a sub-topology, the virtual topology being composed of said sub-topologies.

Advantageously, said method further comprises a step of using the extracted virtual topology by the routing algorithm.

Advantageously, the extracted virtual topology is a structured topology suitable for a routing algorithm intended for a structured topology, a structured topology being a topology defined by a predetermined mathematical formalism.

The predefined type of network topology is chosen from among a list comprising a PGFT network topology, a 2D Torus network topology, a 3D Torus network topology, a HyperX network topology.

According to a second aspect, the invention relates to a routing method in an unstructured physical topology of a high-speed network according to a routing algorithm intended for a structured topology, a structured topology being a topology defined by a predetermined mathematical formalism, said method comprising the following steps:
   finding out the unstructured physical topology;
   analysis and validation of the physical topology found;
   extraction, according to the extraction method presented above, of a virtual topology suitable for the routing algorithm;
   analysis and validation of the structure of the extracted virtual topology;
   calculation of the routing tables suitable for the extracted virtual topology;
   merging of the routing tables associated with the physical topology so as to obtain the routing tables suitable for the structured virtual topology;
   loading, in the extracted virtual topology, of the merged routing tables.

According to a third aspect, the invention relates to a computer program product implemented on a storage medium, capable of being run on an electronic data processing unit and comprising instructions for the implementation of the method summarized above.

Other characteristics and advantages of the invention will appear more clearly and in more detail from the following description of preferred embodiments, provided with reference to the appended drawings in which:

DETAILED DESCRIPTION OF NON-LIMITING EMBODIMENTS

Figure 1:
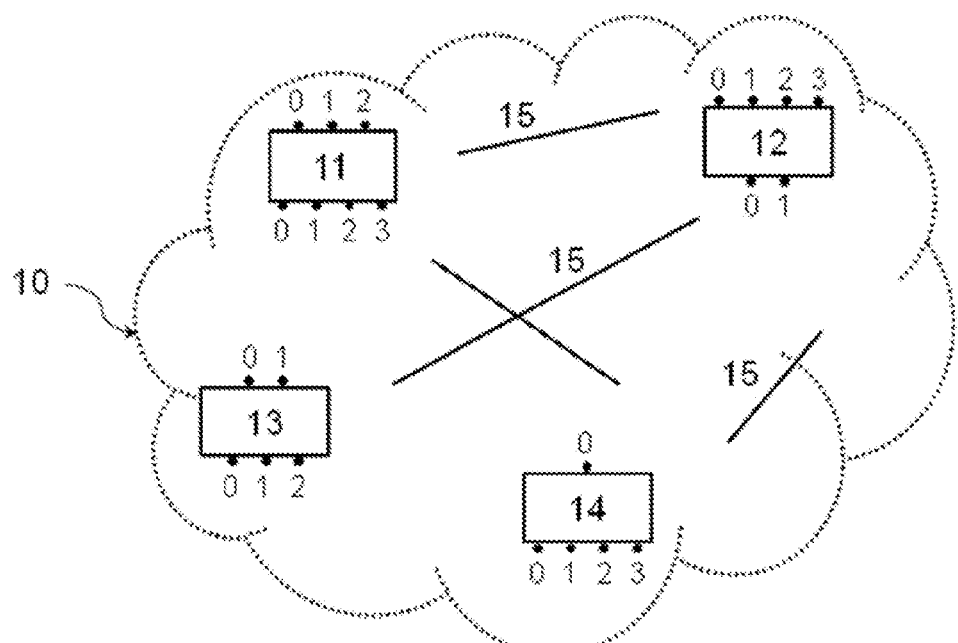
FIG. 1 diagrammatically illustrates any type of structured network topology.

Represented in FIG. 1 is a structured topology 10. By way of non-limiting examples, the structured physical topology 10 is of the PGFT, Hypercube, Butterfly, HyperX, 2D Torus, 3D Torus or De Bruijn graph type.

A specific routing protocol is implemented in this structured physical topology 10. Said routing protocol enables the establishment of route(s), or path(s), between a source node and a destination node of the network. A route is formed by the succession of links 15 and network switches 11-14 to connect said two nodes.

In this regard, the network switches 11-14 are configured in order to form a distributed routing based on routing elements (for example, routing tables) defining the rules enabling the conveyance of data packets to their destination.

Moreover, a network switch 11-14 comprises a routing table by port 0-3. The routing elements are independent of the input port 0-3 of a network switch 11-14 by which data to be routed arrives. However, the link 15 on which data is routed depends on the input ports 0-3 and on the destination of said data.

The implementation of a routing protocol in the structured physical topology 10 is generally preceded by the following steps:
   finding out the structured physical topology 10 of the network;
   analysis and validation of the structure of said structured physical topology 10;
   calculation of the routing tables; and
   loading of the routing tables.

Figure 2:
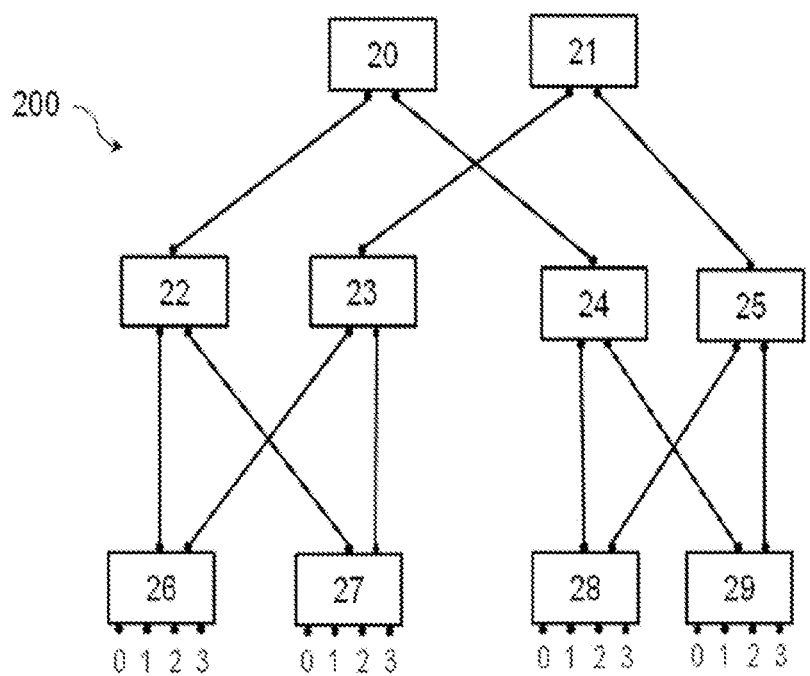
FIG. 2 diagrammatically illustrates a PGFT (Parallel Ports Generalized Fat Trees) type of structured network topology used in the following to illustrate one embodiment.

FIG. 2 illustrates a structured physical topology 200 comprising switches 20-29, in which a routing algorithm specific to the PGFT can be implemented. The particular type of PGFT topology is only given here by way of illustration, and is in no way limited thereto. The embodiments described above extend directly and unambiguously to the different types of topology, including but not limited to Hypercube, Butterfly, HyperX, 2D Torus, 3D Torus or De Bruijn graph.

Figure 3:
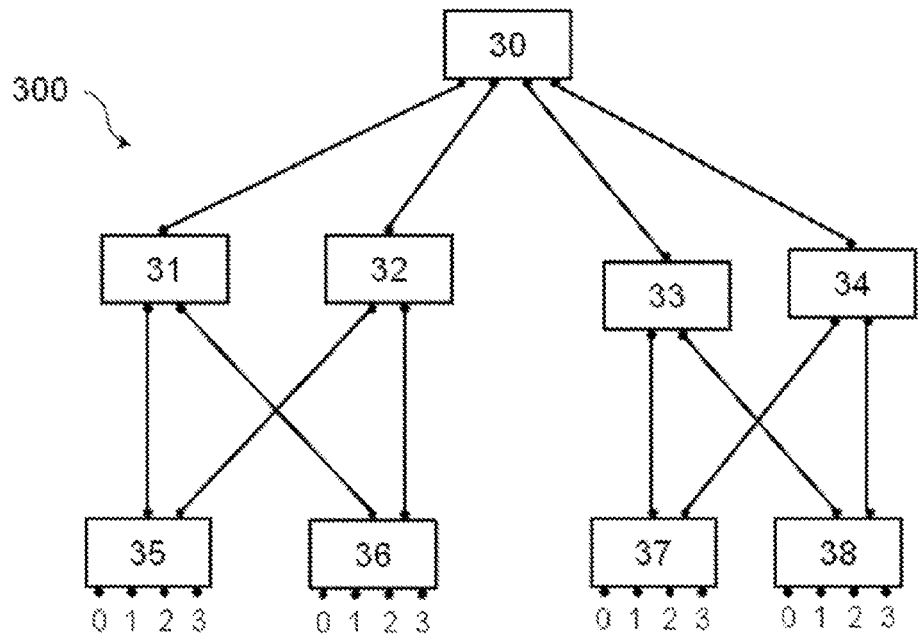
FIG. 3 diagrammatically illustrates an unstructured network topology for extracting therefrom a structured virtual topology suitable for a routing algorithm intended for a structured network topology.

Structured topologies are expensive, principally due to the number of switches at the top of the network (called "top switch"). In this instance, the structured physical topology 200 of FIG. 2 is a PGFT comprising two top switches 20-21. Moreover, within the theoretical scope of PGFT routing, the number of top switches 20-21 cannot be reduced without losing characteristic properties of the topology. For example, by replacing in FIG. 3 the top switches 20-21 of FIG. 2 with a single top switch 30, the structure of the resulting unstructured topology 300 is no longer suitable for the routing algorithm specific to the PGFT. The physical network topology 300 is different from the PGFT-type physical network topology 200. It follows that the modified structure of the unstructured topology 300 cannot be validated, and PGFT-type routing cannot be achieved (particularly because from the top switch 30, there is no more than one path to a leaf switch 35-38 when passing through the switches 31-34).

More generally, in order to preserve the routing algorithm intended for the structured topology 200 (in this example, PGFT) and to be able to implement it in the unstructured topology 300, a structured virtual topology is extracted from the unstructured topology 300.

More generally, for routing in an unstructured topology 300, resulting from the modification of a structured topology 200, said routing being in accordance with a routing protocol intended for the structured topology 200, the following steps are carried out:
   finding out the modified physical topology 300;
   analysis and validation of the physical topology found;
   extraction of a structured virtual topology suitable for the routing algorithm that is intended for a structured topology;
   analysis and validation of the structure of the structured virtual topology;
   calculation of the routing tables suitable for the structured virtual topology;

merging of the routing tables associated with the physical topology so as to obtain the routing tables suitable for the structured virtual topology;

loading of the merged tables.

The step of extracting a structured virtual topology suitable for the routing algorithm intended for a structured topology results in:

the decorrelation of the memory topology from the physical topology; and the separation of the network switches into logically independent entities.

To illustrate the step of extracting a structured virtual topology suitable for the routing algorithm, the unstructured topology 400 (FIG. 4) is used solely by way of example. The unstructured topology 400 is called unstructured because, among other things, the top switch 41 has two different paths to reach a leaf switch 45-48. Such topology therefore does not represent a PGFT.

In this example, a PGFT structured virtual topology 500 is extracted from an unstructured physical topology 400 that is not a PGFT. The routing algorithms then use only the structured virtual topology, and not the unstructured physical (real) topology 400, which is not supported.

In order to identify such a structured virtual topology, the leaf switches 45-48 are first considered. The leaf switches 45-48 are those that are directly connected to the computing nodes. Each of the leaf switches 45-48 is placed in a sub-topology G1: 45, G2: 46, G3: 47 and G4: 48. The sub-topologies G1-G4 have no switch in common and each comprises a leaf switch. Each of the sub-topologies G1-G4 is considered to be a PGFT, just like the type of physical network topology 200. Because the sub-topologies G1-G4 have exactly the same neighbors, they are then merged. In this instance, G1 and G2 are merged into a sub-topology SG1. Similarly, G3 and G4 are merged into a sub-topology SG2. In other words, the sub-topologies G1-G4, respectively formed from the leaf switches 45-48, are merged into sub-topologies SG1 and SG2 so that the sub-topologies G1-G4 having the same neighboring switches are in a same sub-topology SG1 or SG2 (the neighboring switch(es) of a particular switch 41-48 are all from the switches directly connected to said switch). The new sub-topologies SG1 and SG2 are of the PGFT type.

In other words, by identifying the switches 42-44 directly connected to the leaf switches 45-48 of the unstructured physical topology 400 (or the neighboring switches 42-44 of the leaf switches 45-48), the leaf switches 45-48 having the same neighboring switches are distributed into sub-topologies SG1-SG2. Said sub-topologies SG1-SG2 are included in the virtual topology to be extracted.

Considered now are the switches 42-44 that are above the leaf switches 45-48 in the unstructured physical topology 400. The switches 42-44 are the direct neighbors (or the first neighbors) of the leaf switches 45-48. Two direct neighboring switches 42-44 of the leaf switches 45-48 are separated if they are connected to two different sub-topologies SG1-SG2. Thus, a switch 42-44 that is connected only to the switch(es) of a same sub-topology SG1-SG2 is included in (or added to) said sub-topology SG1-SG2. In this instance, the switch 42 is connected only to the sub-topology SG1. The switch 44 is connected only to the sub-topology SG2. The switches 42 and 44 are therefore included respectively in the sub-topology SG1 and the sub-topology SG2. However, the switch 43 is connected to both sub-topologies SG1 and SG2. Said switch 43 is split into two virtual switches 43-SG1 and 43-SG2, respectively included in the sub-topology SG1 and the sub-topology SG2.

The ports of the physical switch 43, which has just been split into two virtual switches 43-SG1 and 43-SG2, are to be distributed between said two virtual switches 43-SG1 and 43-SG2.

To do this, we begin by considering one of the sub-topologies SG1-SG2 (in this instance, SG1). A link leaving SG1 is selected, coming from a lower-level sub-topology G1-G2 (G1, for example) and being connected to the virtual switch 43-SG1. The link connecting the port 5 of the switch 45 to the port 0 of the switch 43 (i.e., the link [45:5→43:0]) is considered. A search is then made for the links connecting the other lower-level sub-topologies included in SG1 to the virtual switch 43-SG1. The link connecting the port 5 of the switch 46 to the port 1 of the switch 43 (i.e., the link [46:5→43:1]) is added to the links considered. Then all of the lower-level sub-topologies in SG1 (in this instance, G1 and G2) are considered, the ports 0 and 1 of the switch 43 are assigned to the virtual switch 43-SG1. The virtual switch 43-SG1 with its ports 0 and 1 is added to the sub-topology SG1.

Similarly, for the sub-topology SG2, the ports 2 and 3 of the switch 43 are assigned to the virtual switch 43-SG2, which is added to the sub-topology SG2.

It follows that the physical switch 43, which is connected to the switch(es) of the sub-topology SG1 and to the switch(es) of the sub-topology SG2, is split into two virtual switches 43-SG1 and 43-SG2. The virtual switch 43-SG1, comprising the ports 0-1 by which it is connected to the switch(es) of the sub-topology SG1, is assigned to said sub-topology SG1. The virtual switch 43-SG1, comprising the ports 2-3 by which it is connected to the switch(es) of the second sub-topology SG2, is assigned to said sub-topology SG2.

The uplink ports 4-5 of the physical switch 43 are also to be distributed between the sub-topologies SG1 and SG2 included in the structured virtual topology.

Figure 4:
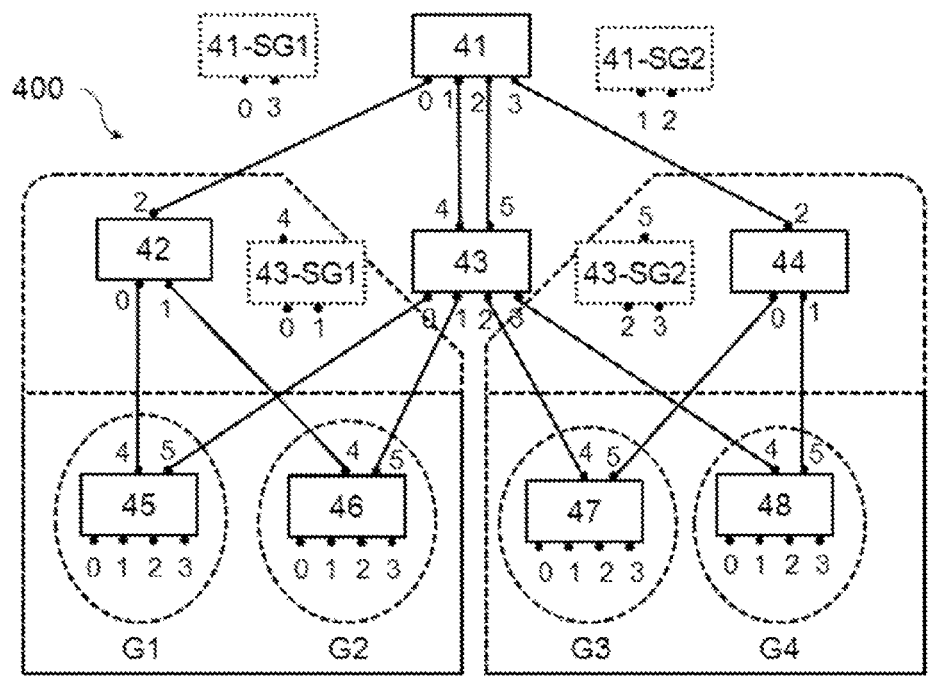
FIG. 4 and FIG. 5 diagrammatically illustrate steps of a method of extracting a structured virtual topology from an unstructured network topology according to one embodiment.

In this regard, the ports by which the split switch 41 is connected to a switch not yet belonging to any sub-topology, in this instance the connector 41, are distributed between the virtual switches 43-SG1 and 43-SG2. This distribution can be done arbitrarily. In the example of FIG. 4, the ports 4 and 5 of the switch 41 are assigned respectively to the virtual switch 43-SG1 and 43-SG2.

Just as for the switches 42-44, the switches above in the unstructured physical topology 400 are now considered. In this example, only the switch 41 is connected to more than one sub-topology. Said switch is therefore split into as many virtual switches as there are sub-topologies to which it is connected, i.e., into two virtual switches 41-SG1 and 41-SG2.

Indeed, for the links belonging to switches shared between two sub-topologies (SG1 and SG2), one of said shared links is considered by placing it arbitrarily in one of the sub-topologies. The links connecting to the other sub-topologies via a switch, virtual or not, that are not yet considered are sought. The virtual switch 41-SG1 comprises the ports 0 and 3. The second virtual switch 41-SG2 comprises the ports 1 and 2. The new sub-topologies SG1 and SG2 are of the PGFT type.

More generally, the extraction of the virtual topology is done by successive approaches from the leaf switches 45-48 to the top switch 41, adding to each approach to the top switches the switches to the sub-topologies to which they are uniquely connected and by splitting/fractioning the switches connected to more than one sub-topology into the same number of virtual switches.

Figure 5:
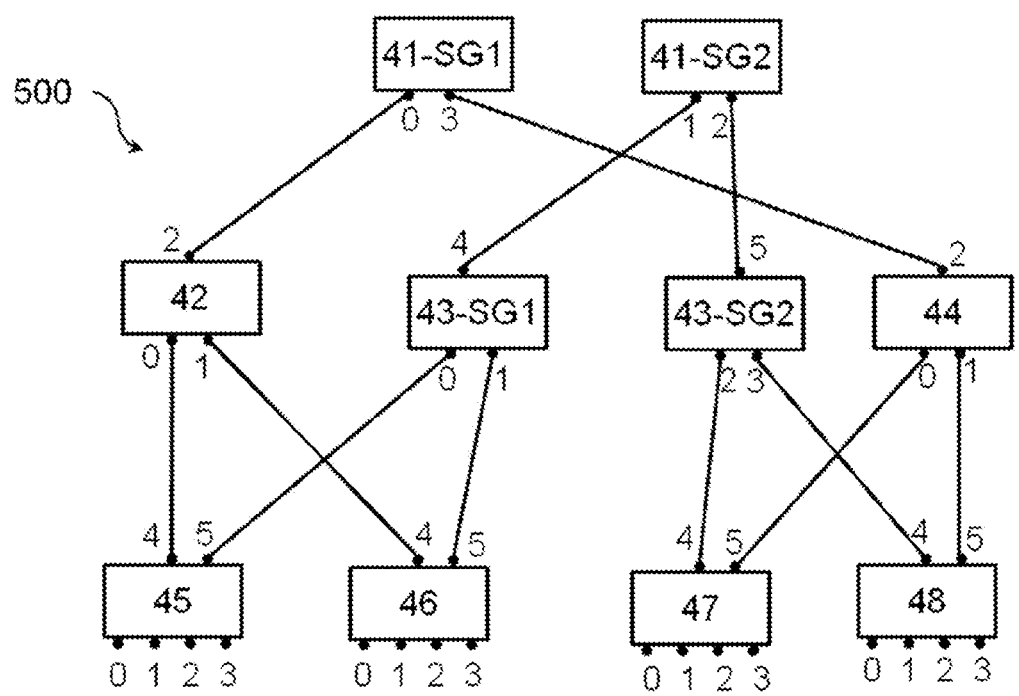

FIG. 5 represents the structured virtual topology, composed of the sub-topology SG1 and SG2, which has just been extracted from the unstructured physical topology 400. In this illustrative example, each of the two physical switches 41 and 43 is divided into two virtual switches. The extracted structured virtual topology comprises two more switches than the real topology.

In considering the two virtual switches 43-SG1 and 43-SG2 produced from the physical switch 43, one consisting of ports 0 and 1 and the other of ports 2 and 3, the routing algorithm causes the packets arriving at the ports 0 and 1 to be sent to the sub-topology SG1, without the possibility of reaching the other sub-topology SG2, and vice versa. Furthermore, the routing elements, "particularly the routing tables," are independent. Thus, no conflict is possible: the routing tables of one port can be written at one value without disturbing or influencing the other ports. It is therefore impossible to corrupt the memory. Moreover, the virtual splitting of the switches makes it possible to rearrange the memory topology into a topology suitable for the specific routing algorithms, all while reducing costs.

The structured virtual topology extracted from an unstructured physical topology (which itself is obtained from a modified structured physical topology) enables the initial routing algorithm to be preserved. Indeed, in this example, the extracted structured virtual topology is a true PGFT suitable for the routing protocol. The routing algorithms dedicated to physical topologies of this type will function on virtual topologies belonging to this same type of topology. More generally, the topology used by the routing algorithm is based on the extracted virtual topology above the physical and logical networks. Keeping a virtual structured topology in agreement with the routing algorithm thus makes it possible to preserve the performance of said algorithm.

It should be noted that even if the type, considered above, of network topology is PGFT (a network topology based on a tree structure), the same approach is applied to other types of network topologies so that the method of extracting the virtual topology can be extended to other topologies. Indeed, by way of non-limiting examples, in the case of a 2D Torus-type network topology (a network topology based on a rectangle), the first sub-topologies G1-G4 are each a leaf switch (switches directly connected to computing nodes). Starting from a 2D Torus-type sub-topology, said network sub-topology is extended by including therein other switches so that the new sub-topology remains a 2D Torus type. To do this, one side of the rectangle of size n of a 2D Torus-type topology is taken into consideration for searching for switches connected to each of its lines. When a switch is connected to different sub-topologies, it can be divided into several virtual switches in order to extend the dimension of said sub-topologies;

in the case of a 3D Torus-type network topology (a network topology based on a tile), the first sub-topologies are each a leaf switch (switches having computing nodes connected). Starting with a sub-topology, a set of other sub-topologies is sought, enabling the extension according to the basic schema of a 3D Torus topology, which is a tile. Each side of the tile is taken into consideration for searching for switches that are connected thereto. If one switch is connected to different sub-topologies, then said switch is divided into that same number of virtual switches;

in the case of a HyperX-type network topology (a network topology based on a set of connected switches all interconnected), the first sub-topologies can be the leaf switches (switches directly connected to computing nodes). The set of sub-topologies is extended in parallel by finding all of the interconnected neighboring switches. The switches belonging to a same sub-topology must be connected to the switches of said same sub-topology. If a switch is connected to a plurality of sub-topologies, it is then split into the same number of virtual computers that will subsequently be considered as switches for extending the sub-topologies. As a result of the recursivity of the topology, the extension for HyperX is close to that of PGFT; composition of sub-topologies from sets of switches previously identified: the leaf switches (45-48) having the same neighboring switches initialize the sub-topologies (SG1 and SG2). Said sub-topologies will be merged in order to generate the overall virtual topology.

Obtaining a structured virtual topology from an unstructured physical topology advantageously makes it possible to:

generalize the use (and therefore broaden the field of application) of the routing algorithms for unsupported physical topologies without having to modify said routing algorithms dedicated to said physical topologies;

reduce the cost of network infrastructures while preserving network performance in terms of routing;

decouple the physical topology from the routed topology;

split a physical switch into virtual switches thanks to the tables by ports.

Advantageously, the method described above for extracting, from a physical network topology, a virtual topology suitable for a predefined routing algorithm, allows:

the splitting of a physical switch into virtual switches: each port of the physical switch can belong to a different virtual switch. Thus, a virtual switch is a set of ports belonging to a same physical switch;

the identification of a set of switches that can serve as a basis for the construction of a target virtual topology. For example, for a PGFT, the leaf switches are meant to represent the switches of the first level of the PGFT. Said first set can be formed from physical or virtual switches;

the extension of the base assembly by splitting the physical switches so that the structure of the extracted virtual topology coincides with the structure dedicated to the routing algorithm (for example, PGFT, Torus, HyperX, dragonfly).

It should be noted that the terms "network communicator" or "switch" are used interchangeably to designate any routing equipment in a high-speed network.

The invention claimed is:

1. A method of extracting, from a physical network topology, a virtual topology suitable for a predefined routing algorithm, the physical network topology including a plurality of switches connected to each other by their ports in order to receive and/or transmit packets to or from leaf switches of said physical network topology, said physical network topology being different from a physical network topology of a predefined type of a network topology suitable for the predefined routing algorithm, said method comprising the following steps:

a) identification, in the physical network topology, of a plurality of sub-topologies, said sub-topologies having no switch in common, each sub-topology being of the predefined type of network topology and including at least one leaf switch, no switch of one sub-topology being connected to a switch of another sub-topology;

b) extension of each sub-topology by including therein one or more switches that are directly connected thereto and not being directly connected to any other sub-topology in such a way that the extended sub-topology is of the predefined type of network topology;
c) when a switch is directly connected to more than one sub-topology, splitting said switch into the same number of virtual switches, each virtual switch comprising the port or ports of the split switch by means of which said split switch is connected to the switch(es) of a sub-topology, the ports by means of which the split switch is connected to a switch not yet belonging to any sub-topology being distributed among the virtual switches, said virtual switches being considered as being switches;
d) repetition of steps b) and c) until each switch is included in a sub-topology, the virtual topology being composed of said sub-topologies.

2. The method of claim 1, further comprising a step of using the extracted virtual topology by the routing algorithm.

3. The method of claim 1, wherein the extracted virtual topology is a structured topology suitable for a routing algorithm intended for a structured topology, a structured topology being a topology defined by a predetermined mathematical formalism.

4. The method according to claim 1, wherein the predefined type of network topology is chosen from among a list comprising a PGFT network topology, a 2D Torus network topology, a 3D Torus network topology, a HyperX network topology.

5. A routing method in an unstructured physical topology of a high-speed network according to a routing algorithm intended for a structured topology, a structured topology being a topology defined by a predetermined mathematical formalism, said method comprising the following steps:
  finding out the unstructured physical topology;
  analysis and validation of the physical topology found;
  extraction, according to a method presented in claim 1, of a virtual topology suitable for the routing algorithm;
  analysis and validation of the structure of the extracted virtual topology;
  calculation of the routing tables suitable for the extracted virtual topology;
  merging of the routing tables associated with the physical topology so as to obtain the routing tables suitable for the structured virtual topology;
  loading, in the extracted virtual topology, of the merged routing tables.

* * * * *